United States Patent
Shah et al.

(10) Patent No.: US 11,354,204 B2
(45) Date of Patent: Jun. 7, 2022

(54) HOST MULTIPATH LAYER NOTIFICATION AND PATH SWITCHOVER FOLLOWING NODE FAILURE

(71) Applicant: International Business Machines Corporation, Armonk, NY (US)

(72) Inventors: Komal Shailendra Shah, Pune (IN); Bharti Soni, Jaipur (IN); Shrirang Shrikant Bhagwat, Pune (IN); Sourab Gupta, Pune (IN)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 16/429,110

(22) Filed: Jun. 3, 2019

(65) Prior Publication Data
US 2020/0379857 A1 Dec. 3, 2020

(51) Int. Cl.
*G06F 11/20* (2006.01)
*G06F 13/42* (2006.01)
*G06F 13/40* (2006.01)

(52) U.S. Cl.
CPC ...... *G06F 11/2007* (2013.01); *G06F 13/4027* (2013.01); *G06F 13/4221* (2013.01)

(58) Field of Classification Search
CPC .............. G06F 11/2007; G06F 13/4027; G06F 13/4221
See application file for complete search history.

(56) References Cited

U.S. PATENT DOCUMENTS

| | | | |
|---|---|---|---|
| 6,643,795 B1 | 11/2003 | Sicola et al. | |
| 7,093,265 B1* | 8/2006 | Jantz | G06F 13/385 |
| | | | 710/316 |
| 7,363,382 B1* | 4/2008 | Bakke | G06F 11/201 |
| | | | 709/239 |
| 7,668,981 B1* | 2/2010 | Nagineni | H04L 69/40 |
| | | | 710/36 |
| 9,755,889 B2* | 9/2017 | Griswold | H04L 41/069 |
| 2002/0133735 A1 | 9/2002 | McKean et al. | |
| 2004/0078632 A1* | 4/2004 | Infante | G06F 3/0613 |
| | | | 714/4.2 |

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Nimesh G Patel
(74) *Attorney, Agent, or Firm* — Stosch Sabo

(57) ABSTRACT

Described herein are techniques for managing failover in a data center environment interconnected using an internet small computer systems interface (iSCSI) communication protocol, the techniques including receiving, at a host and from a kernel driver, an asynchronous message comprising an indication of a failed path associated with a first node having a first port, a list of internet protocol (IP) addresses associated with a plurality of failover paths including a first failover path associated with a second node having a second port, and an expiration. The techniques further including performing, by the host and before the expiration, a first input/output (I/O) operation on the second port associated with the second node. The techniques further including performing, by the host and after the expiration, a second I/O operation on the first port of the first node.

20 Claims, 10 Drawing Sheets

(56) References Cited

U.S. PATENT DOCUMENTS

| | | | |
|---|---|---|---|
| 2004/0148443 A1* | 7/2004 | Achiwa | G06F 11/2069 |
| | | | 710/36 |
| 2012/0266014 A1* | 10/2012 | Doeden | G06F 11/2041 |
| | | | 714/E11.073 |
| 2015/0269039 A1 | 9/2015 | Akirav et al. | |
| 2016/0179637 A1 | 6/2016 | Winokur | |
| 2019/0286353 A1* | 9/2019 | Soni | G06F 9/45558 |

* cited by examiner

600 ⟶

602
LOGGING OUT FROM A FIRST INTERNET PROTOCOL (IP) ADDRESS ASSOCIATED WITH THE FIRST PORT ON THE FIRST NODE IN RESPONSE TO RECEIVING THE ASYNCHRONOUS MESSAGE AND BEFORE THE EXPIRATION

↓

604
LOGGING INTO A SECOND IP ADDRESS FROM THE LIST OF IP ADDRESSES, THE SECOND IP ADDRESS ASSOCIATED WITH THE SECOND PORT ON THE SECOND NODE IN RESPONSE TO RECEIVING THE ASYNCHRONOUS MESSAGE AND BEFORE THE EXPIRATION

612
LOGGING OUT OF THE SECOND IP ADDRESS ON THE SECOND PORT OF THE SECOND NODE AFTER THE EXPIRATION

↓

614
LOGGING INTO THE FIRST IP ADDRESS ON THE FIRST PORT OF THE FIRST NODE AFTER THE EXPIRATION

702
LOGGING OUT FROM A FIRST INTERNET PROTOCOL (IP) ADDRESS ASSOCIATED WITH THE FIRST PORT ON THE FIRST NODE IN RESPONSE TO RECEIVING THE ASYNCHRONOUS MESSAGE AND BEFORE THE EXPIRATION

↓

704
RECONFIGURING THE FIRST IP ADDRESS TO BE ASSOCIATED WITH THE SECOND PORT ON THE SECOND NODE

↓

706
LOGGING INTO THE FIRST IP ADDRESS ASSOCIATED WITH THE SECOND PORT ON THE SECOND NODE IN RESPONSE TO RECEIVING THE ASYNCHRONOUS MESSAGE AND BEFORE THE EXPIRATION

712
LOGGING OUT OF THE FIRST IP ADDRESS ON THE SECOND PORT OF THE SECOND NODE AFTER THE EXPIRATION

↓

714
RECONFIGURING THE FIRST IP ADDRESS TO BE ASSOCIATED WITH THE FIRST PORT ON THE FIRST NODE

↓

716
LOGGING INTO THE FIRST IP ADDRESS ON THE FIRST PORT OF THE FIRST NODE AFTER THE EXPIRATION

FIG. 7B

HOST MULTIPATH LAYER NOTIFICATION AND PATH SWITCHOVER FOLLOWING NODE FAILURE

BACKGROUND

The present disclosure relates to computational redundancy, and, more specifically, to failover and/or failback operations in a computational environment.

Multipath input/output (I/O) is used to improve performance and/or fault-tolerance in processors and computational systems. Multipath I/O refers to the identification of multiple paths between processing resources and storage resources via one or more buses, controllers, switches, and/or bridges. Multipath drivers can redirect I/O operations to alternative paths when an original path is determined to be unavailable, faulty, or otherwise dysfunctional.

SUMMARY

Aspects of the present disclosure are directed toward a computer-implemented method for managing failover in a computational environment connected using an internet small computer systems interface (iSCSI) communication protocol, the method comprising receiving, at a host and from a kernel driver, an asynchronous message comprising an indication of a failed path associated with a first node having a first port, a list of internet protocol (IP) addresses associated with a plurality of failover paths, the plurality of failover paths including a first failover path associated with a second node having a second port, and an expiration. The method further comprising, in response to receiving the asynchronous message, performing, by the host and before the expiration, a first input/output (I/O) operation on the second port associated with the second node using the first failover path. The method further comprising, in response to performing the first I/O operation on the second port, performing, by the host and after the expiration, a second I/O operation on the first port of the first node, where the failed path is restored after the expiration.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6A illustrates a flowchart of an example method for performing an I/O operation on a failover path before an expiration indicated in an asynchronous message, in accordance with embodiments of the present disclosure.

FIG. 6B illustrates a flowchart of an example method for performing an I/O operation on a failback path after an expiration indicated in an asynchronous message, in accordance with embodiments of the present disclosure.

FIG. 7A illustrates a flowchart of another example method for performing an I/O operation on a failover path before an expiration indicated in an asynchronous message, in accordance with embodiments of the present disclosure.

FIG. 7B illustrates a flowchart of another example method for performing an I/O operation on a failback path after an expiration indicated in an asynchronous message, in accordance with embodiments of the present disclosure.

Figure 1:
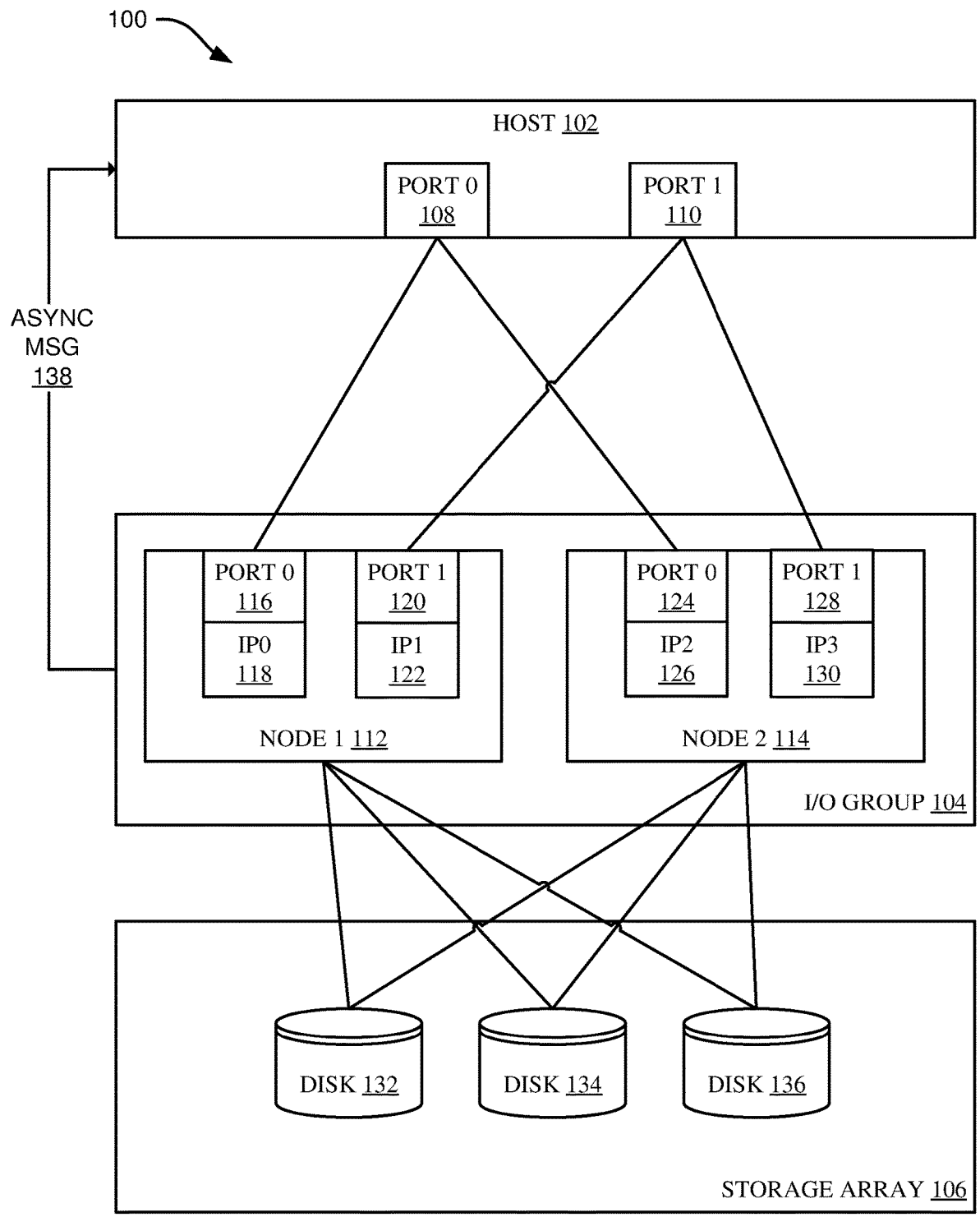
FIG. 1 illustrates a block diagram of a computational environment at a first instance and having a failed node, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward to computational redundancy, and, more specifically, to failover and/or failback operations in a computational environment. While not limited to such applications, embodiments of the present disclosure may be better understood in light of the aforementioned context.

In computational environments (e.g., data center environments, virtual environments, computer environments, networked resource environments, distributed computational networks, storage-area networks, etc.), hosts are connected to backend storage using interconnect protocols (e.g., Internet Small Computer Systems Interface (iSCSI), Fibre Channel (FC), iSCSI Extensions for Remote Direct Memory Access (RDMA) (iSer), and so on). To access storage, hosts discover storage devices connected to the host and login to the storage devices using one of the protocols previously mentioned. Typically, this involves an initiator (e.g., host) and a target (e.g., node) communicating with each other, where the initiator discovers the target, logs into the target, and then can see the target devices. The initiator can then issue input/output (I/O) operations on the target devices as if they were locally connected devices.

A Storage Area Network (SAN) Volume Controller (SVC) is a storage controller that can serve the host with iSCSI target functionality. SVC is a product of International Business Machines (IBM) Corporation. SVC can be implemented as a clustered system of multiple nodes, with each node capable of being an iSCSI target. For redundancy purposes, iSCSI connections to multiple nodes (typically 2) are recommended. Generally, two nodes belong to one I/O group. As used herein, an I/O group can refer to a pair of nodes within a single physical or virtual enclosure. When a write operation is performed to a volume, the node that processes the I/O operation duplicates the data onto the partner node that is in the I/O group. After the data is protected on the partner node, the write operation to the host application is completed, and the data can be physically written to the disk later.

In SVC, both nodes in an I/O group can serve I/O requests simultaneously, but the SVC typically has a preferred node for each virtual disk (VD or vdisk). Hosts that support the SCSI Asymmetric Logical Unit Access (ALUA) standard can send I/O requests to the preferred node of that vdisk. If the preferred node becomes unavailable (e.g., fails, restarts, loses connectivity, etc.), then the host can issue the I/O requests to the non-preferred node.

As a result, if one node becomes unavailable, another node in the cluster detects this node failure (e.g., using SVC, a kernel driver, a Cluster State Machine, a storage controller, or a different configuration of hardware and/or software) and takes care of the iSCSI connections present on the failed node. This process can be referred to as "SVC node failover." Once the failed node returns to functionality, iSCSI connections are set back on the original node. This process can be referred to as "SVC node failback." On the SVC side, as a part of node failover, SVC unconfigures all the IPs on ethernet port(s) on the failed node and reconfigures these IPs on the partner node from the same I/O group.

There are a few storage controllers that do not support node failover/failback processes. In this case, if a node fails, the host must wait for the node to become active to continue I/O.

In SVC systems, once login is established, the Transmission Control Protocol (TCP) connection is handled by the kernel. The user driver and the kernel work together to serve the I/O requests from the user. Since the TCP level communication is handled by the kernel, if the target node restarts due to failure or some other reason, then the TCP connection remains intact because it is located in the kernel. During this period, the host is not aware that the target node is not available and continues to send the I/O requests to the target node, but the target node is unable to serve any I/O as the target node is unavailable. When no I/O response is received by the host, an I/O timeout (e.g., an SCSI I/O timeout) will cause a multipath driver to retry the I/O operations on the non-preferred node which is alive and operational.

This process of detecting the I/O timeout then retrying on other paths is inefficient because it depends on the I/O timeout value. As a result, I/O operations will experience poor performance until the I/O timeout value is reached. During the time period when SVC I/O process becomes unavailable, the host wastes resources and time in re-sending I/O requests to the SVC target. In a computational environment, where hundreds of time critical applications can be running on the host, this may not be desirable as it may lower the performance.

Some solutions are contemplated that could reduce the amount of time a host spends serving I/O to a failed node until the I/O timeout expires. As one example, a TCP keepalive function can be used to check the condition of connected sockets and determine whether the connection remains operational or not. In this example, a host could use the TCP keepalive function to determine whether a target node is available or unavailable. However, this solution may have the disadvantage of depending on a timeout value for the keepalive function. Thus, the TCP keepalive function requires an amount of time to confirm that a target node is unavailable. This is a similar problem as presented by the I/O timeout value, namely, that I/O will continue to be served to the target node without being processed by the target node until expiration of the timeout value associated with the keepalive function. Second, implementing keepalive functionality in a TCP environment is not mandatory. Thus, the keepalive function is not an option in environments that are not configured to enable keepalive functionality.

Another solution relies on iSCSI NOP-In and/or NOP-Out functionality. A host can use the NOP-Out functionality to ping a target node. If the host receives a NOP-In from the target node in response to the NOP-Out, then the target node is active. If the host receives no response, then the target node is unavailable. This solution poses similar drawbacks as previously discussed. Namely, the host must issue NOP-Out commands at repeated intervals to confirm the target node remains available. This repeated sending of commands consumes host resources. Likewise, the target node, when available, must issue NOP-In responses to each host-issued NOP-Out. This repeated sending of responses consumes target node resources. Furthermore, the repeated sending of NOP-Out and NOP-In messages consumes network resources. Finally, there is still a delay in the host discovering a failed node. In other words, the time between a node failing and the next interval at which a host issues a NOP-Out to the failed node represents a time interval during which I/O may be unsuccessfully served to the failed target node.

As can be seen above, there may be a need for a solution which expedites failed node discovery in computational environments. Aspects of the present disclosure are directed to techniques for notifying a host of a node failure and enabling a multipath driver to quickly switch to another beneficial path. Aspects of the present disclosure realize this solution by, for example, 1) identifying the failed node using, for example, a kernel associated with the failed node or another component, module, driver, or controller associated with the failed node and capable of promptly identifying the failed node. Aspects of the present disclosure further realize this solution by 2) issuing an asynchronous message indicating the failed node and a list of IP addresses indicating alternative paths (e.g., failover paths) the host can use to successfully serve I/O requests that would otherwise be sent to the failed node.

Referring now to FIG. 1, illustrated is a block diagram of a computational environment at a first instance 100, in accordance with embodiments of the present disclosure. The computational environment at the first instance 100 includes a host 102, an I/O group 104, and a storage array 106. Resources of the storage array 106 (e.g., disk 132, disk 134, and/or disk 136) are utilized by the host 102 via node 1 112 and node 2 114 in the I/O group 104.

The host 102 includes port 0 108 that is coupled to port 0 116 of node 1 112 using IP address 0 118. Port 0 108 is also coupled to port 0 124 of node 2 114 using IP address 2 126. Host 102 further includes port 1 110 coupled to port 1 120 of node 1 112 using IP address 1 122. Port 1 110 is also coupled to port 1 128 of node 2 114 using IP address 3 130.

Embodiments of the present disclosure are directed to quickly redirecting I/O operations served to a failed node by the host 102. As will be appreciated by one skilled in the art, traditional systems may detect a failed node after expiration of an I/O timeout interval. As a result, many I/O operations can be served to a failed node before the host 102 becomes aware that the failed node is unable to process the I/O operations. In contrast, the present disclosure can use an asynchronous message 138 to indicate a failed node and enable the host 102 to quickly redirect I/O operations to a functional node. For the sake of explanation alone and without any suggested limitation, assume node 1 112 is a failed node. In some embodiments, the asynchronous message 138 is generated from a component associated with the I/O group 104 (e.g., a failed node such as node 1 112, a peer node such as node 2 114, a kernel driver associated with the failed node, a storage controller, a SVC, etc.). In some embodiments, asynchronous message 138 is generated in response to an identification of a failed node (e.g., node 1 112 in this example). As will be appreciated by those skilled in the art, in embodiments where the asynchronous message 138 is generated by the kernel driver associated with the failed node, the asynchronous message 138 can be generated very soon after the time the node failed (e.g., within microseconds, seconds, or minutes). This can result in prompt notification to the host 102 regarding node failure. The asynchronous message 138 is provided to the host 102 indicating the failed node (e.g., node 1 112) is unable to process I/O operations. In some embodiments, the asynchronous message 138 is provided to the host 102, a multipath driver associated with the host 102, a user driver associated with the host 102, a storage controller, or a different configuration of hardware and/or software capable of implementing failover and/or failback operations in a computational environment.

Asynchronous message 138 can be in protocol data unit (PDU) format and can include, for example, an indication of one or more failed paths (e.g., failed node(s), failed port(s), and/or failed IP address(es)), a list of IP addresses associated with a plurality of failover paths (e.g., failover node(s), a failover port(s), and/or failover IP address(es)), an expiration, an AsyncEvent value, and/or an AsyncVcode value. In some embodiments, the expiration is used to cause I/O operations to be served to a failover path before the expiration and to cause I/O operations to be served to an original failed path after the expiration (where the expiration indicates an amount of time until the original failed path is likely restored). The AsyncEvent value can be, for example, 255 to indicate vendor-specific events, and the AsyncVcode can indicate a LOGOUT command, a RETRY command, and/or other commands configured to cause the host 102 to disconnect from one or more failed paths and reconnect to one or more failover paths. In some embodiments, the list of IP addresses can be associated with any node in the computational environment having adequate resources to serve I/O operations previously intended to be directed to the failed node. Asynchronous message 138 is discussed in more detail hereinafter with respect to FIG. 4.

Figure 2:
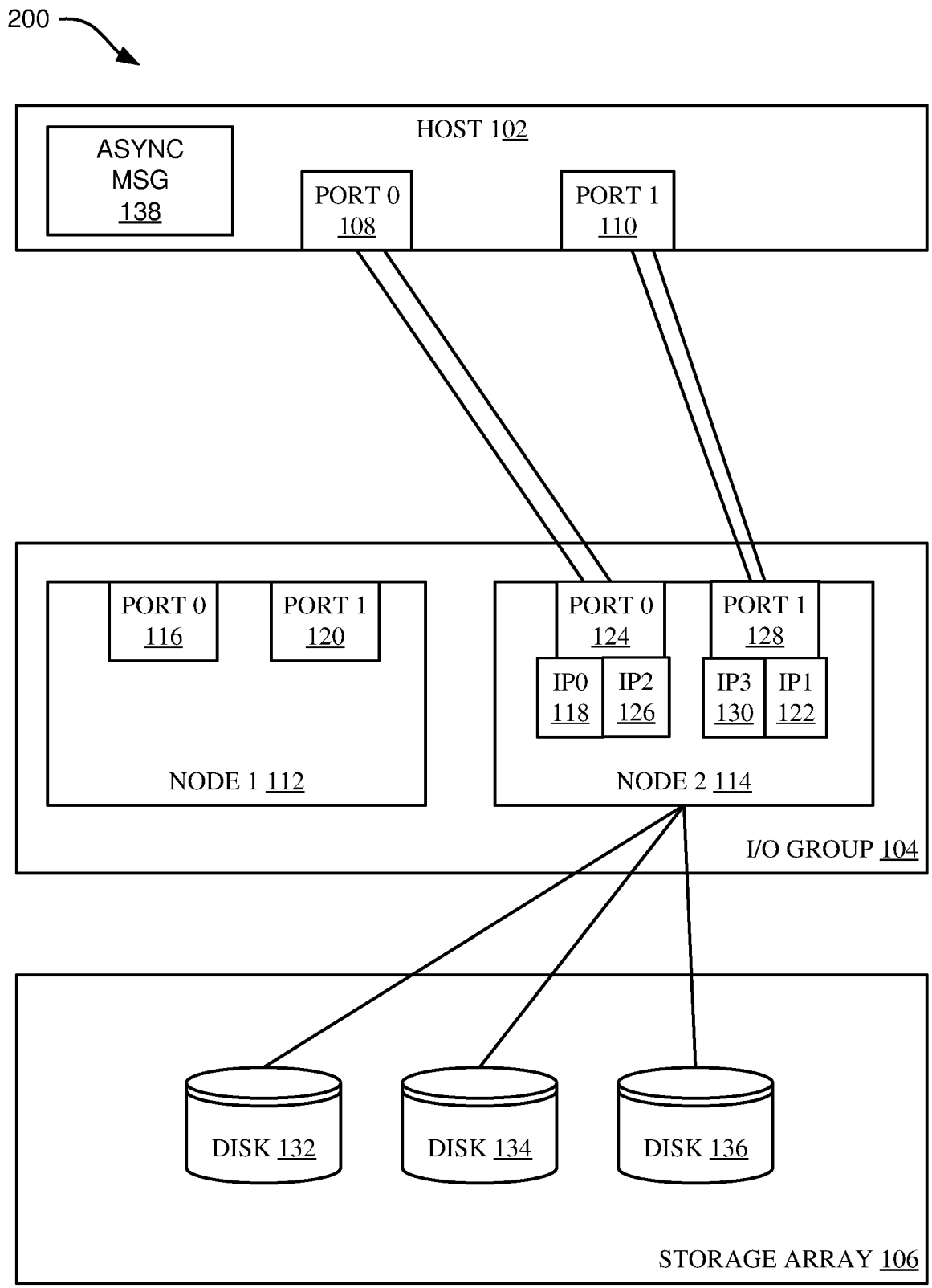
FIG. 2 illustrates a block diagram of the computational environment of FIG. 1 at a second instance after the first instance, in accordance with embodiments of the present disclosure.

Referring now to FIG. 2, illustrated is a block diagram of the computational environment at a second instance 200, where the second instance 200 is after the first instance 100, in accordance with embodiments of the present disclosure.

FIG. 2 includes the components previously discussed with respect to FIG. 1. At the second instance 200 after the first instance 100, and after the host 102 implements the asynchronous message 138, the IP address 0 118 previously associated with port 0 116 on node 1 112 is reconfigured from the failed node (node 1 112) to the failover node listed in the asynchronous message 138 (e.g., node 2 114 in this example). As can be seen, both IP address 0 118 and IP address 2 126 are now associated with port 0 124 of node 2 114. Likewise, IP address 1 122 is reconfigured from port 1 120 of node 1 112 (the failed node) to port 1 128 of node 2 114 (the failover node). Thus, port 1 128 of node 2 114 is associated with both IP address 1 122 and IP address 3 130.

In the second instance 200, the host 102 can successfully serve I/O operations to IP address 0 118 and IP address 1 122 since they are reconfigured on a functional node (e.g., node 2 114). As a result of the migration of the IP address 0 118 and IP address 1 122 from the failed node (node 1 112) to the functional node (node 2 114), fewer I/O operations (if any) are unsuccessfully sent to the failed node while awaiting an I/O timeout expiration, thereby saving time, improving efficiency, and improving reliability of the computational environment.

Although FIG. 2 illustrates IP addresses migrated from a failed path to a failover path, embodiments can exist that use entirely new paths without migrating any IP addresses. For example, embodiments can serve I/O requests to a failover path that includes a failover IP address on a failover port of a failover node, where the failover IP address is one of a plurality of IP addresses included in the asynchronous message 138.

Figure 3:
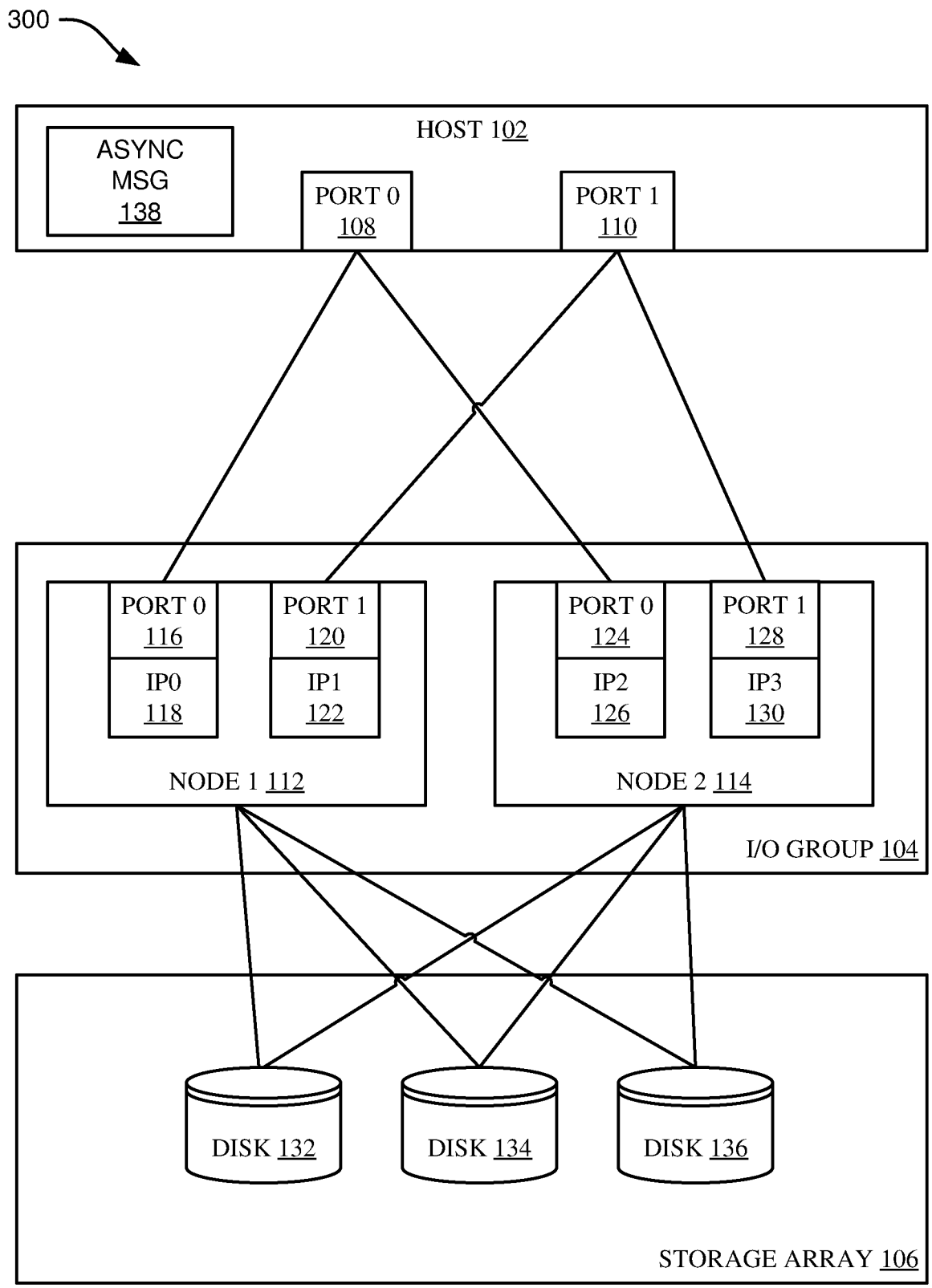
FIG. 3 illustrates a block diagram of the computational environment of FIG. 1 at a third instance after the second instance, in accordance with embodiments of the present disclosure.

Referring now to FIG. 3, illustrated is a block diagram of the computational environment at a third instance 300 after the second instance 200 and after the expiration included in the asynchronous message 138. As shown in FIG. 3, at the third instance 300, the IP address 0 118 is reconfigured to port 0 116 of node 1 112 and the IP address 1 122 is reconfigured to port 1 120 of node 1 112. As is understood by one skilled in the art, there is a reasonable likelihood that node 1 112 is functional after expiration of the time interval indicated in the asynchronous message 138, since expiration of the time interval is typically enough time to restore a failed node (e.g., node 1 112).

Figure 4:
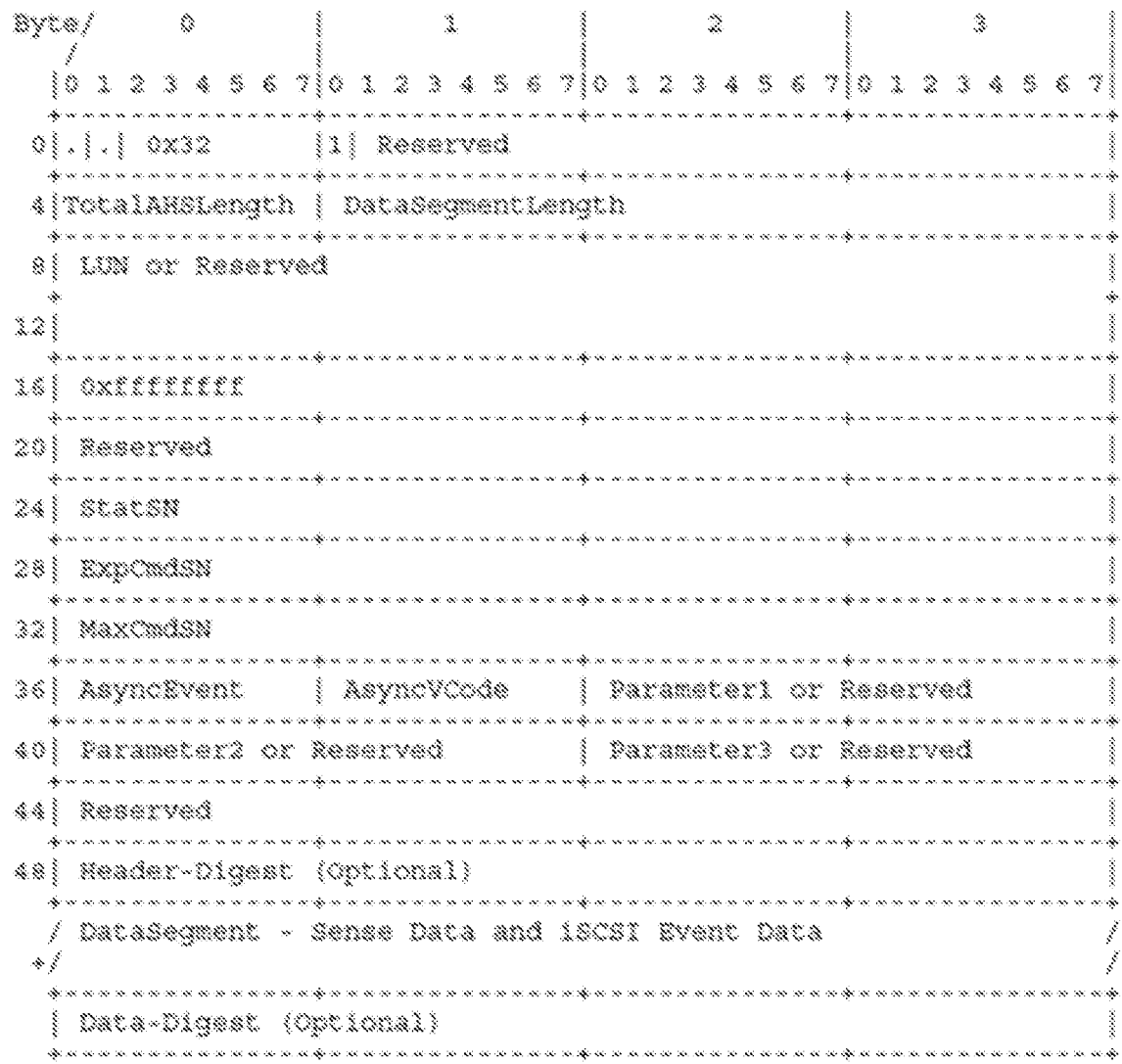
FIG. 4 illustrates a diagram of an example asynchronous message data structure, in accordance with embodiments of the present disclosure.

Referring now to FIG. 4, illustrated is an example asynchronous message 400. In some embodiments, asynchronous message 400 is consistent with asynchronous message 138 of FIG. 1. The asynchronous message 400 can include an indication of a failed path and one or more failover paths. In some embodiments, the indication of the failed path includes an indication of a first port on a first node, and the indication of the failover path indicates a second port on a second node. In some embodiments, the asynchronous message 400 includes an indication of multiple failed paths and multiple failover paths. The failover paths can be identified by a list of IP addresses associated with any node of a clustered system of nodes, where the list of IP addresses can contain any number of IP addresses having appropriate bandwidth to handle I/O operations from a failed path. The failover paths can be based on numerous factors such as, but not limited to, a number of logins associated with the failover IP address, failover port, and/or the failover node, a resource utilization of the failover IP address/port/node, and/or predicted latencies associated with the failover IP address/port/node. Thus, in some embodiments, the failover path is based on a number of logins associated with the failover path being below a login threshold (e.g., less than 5, less than 2, etc.). Likewise, in some embodiments, the failover path is based on a resource utilization associated with the failover path (e.g., the failover node and/or the failover port) being below a utilization threshold (e.g., less than 50%, less than 30%, less than 10%, etc.). The utilization can be any one or any combination of various types of computational utilization such as, but not limited to, processing utilization (e.g., CPU), network utilization (e.g., bandwidth), storage utilization (e.g., cache), and so on.

In some embodiments, asynchronous message 400 is in PDU format. In some embodiments, the asynchronous message 400 includes, for example, a LOGOUT command and/or a RETRY command. The LOGOUT command can instruct the host to logout from a failed path by identifying a failed node, a failed port, and/or a failed IP address associated with the failed path. The RETRY command can instruct the host to login to a failover path by identifying a failover node, a failover port, and/or a failover IP address associated with the failover path. In some embodiments, the failed IP address is reconfigured on the failover path, and thus, the failed IP address the host logs out from on the failed path is the same IP address the host logs into on the failover path. In other embodiments, the RETRY command causes the host to login to an IP address from the list of IP addresses.

In some embodiments, the asynchronous message 400 includes an expiration (e.g., an amount of time, a point of time in the future, etc.). The expiration can be configured to cause the host to redirect I/O operations from a failed path to a failover path prior to the expiration and direct I/O operations to the original failed path after expiration (e.g., when the failed path is likely restored).

In some embodiments, the asynchronous message 400 includes an AsyncEvent code and/or an AsyncVcode. The AsyncEvent code can be 255 which can indicate a vendor-specific iSCSI event. The AsyncVcode can include a LOGOUT command, a RETRY command, and/or other commands, together with any necessary information to implement the commands (e.g., a failed path, a failover path, etc.).

Figure 5:
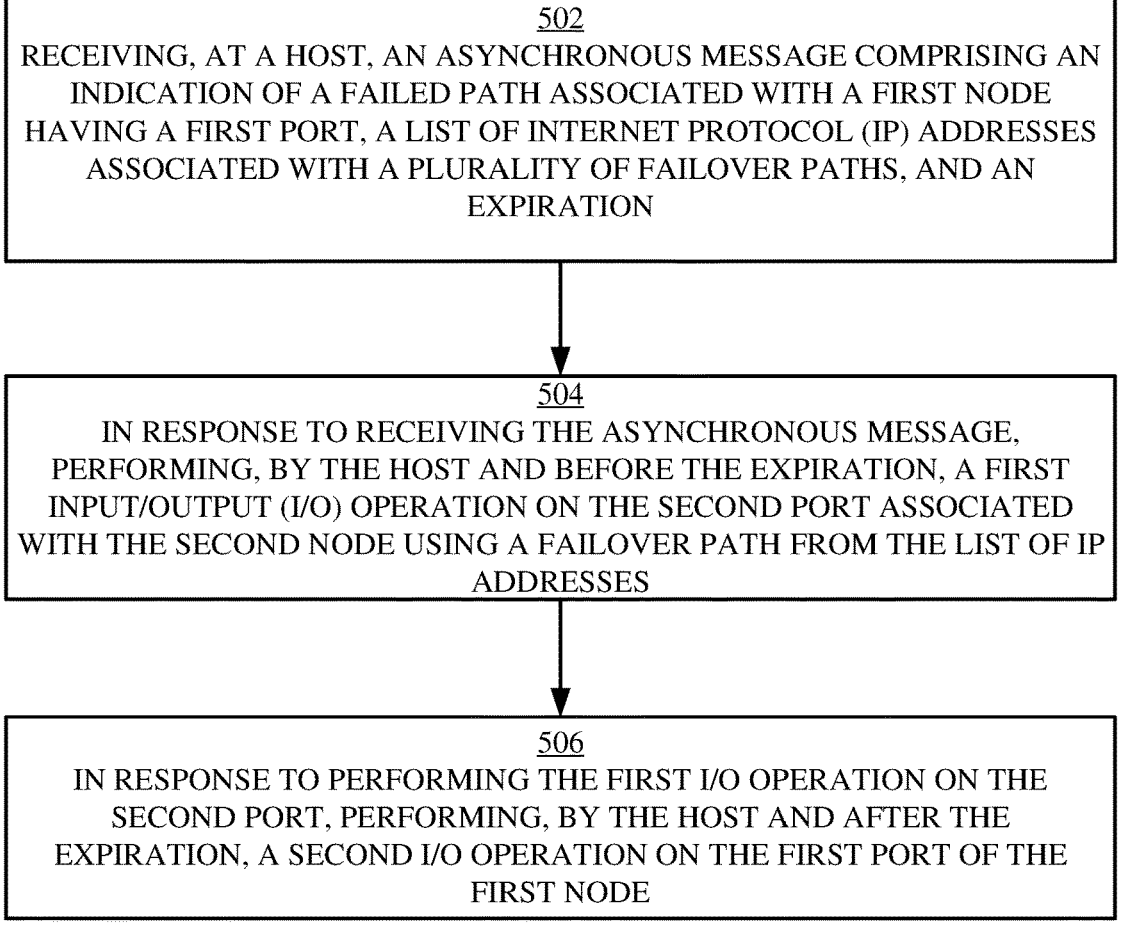
FIG. 5 illustrates a flowchart of an example method for performing failover and/or failback operations in a computational environment, in accordance with embodiments of the present disclosure.

Referring now to FIG. 5, illustrated is a flowchart of an example method 500 for managing failover in a computational environment connected using an internet small computer systems interface (iSCSI) communication protocol, in accordance with embodiments of the present disclosure. The method 500 can be performed by, for example, a failover manager (e.g., failover manager 800 of FIG. 8) or a different configuration of hardware and/or software.

Operation 502 includes receiving, at a host (e.g., host 102), an asynchronous message (e.g., asynchronous message 138 or 400) comprising an indication of a failed path associated with a first node (e.g., node 1 112) having a first port (e.g., port 0 116), a list of IP addresses associated with a plurality of failover paths, and an expiration. In some embodiments, the list of IP addresses includes a first failover path having a second IP address (e.g., IP address 2 126) associated with a second node (e.g., node 2 114) having a second port (e.g., port 0 124). In some embodiments, the asynchronous message is generated by a kernel driver associated with the first node and/or the second node. Advantageously, the kernel driver can identify the failed node promptly. Thus, the host is notified by the asynchronous message of the failed path much faster than the host would otherwise discover the failed path (e.g., by awaiting an I/O timeout expiration). In some embodiments, the asynchronous message is generated by a storage controller, a SVC, or a different driver, module, or component capable of detecting the failed path. In some embodiments, the first node and the second node are in a same I/O group (e.g., I/O group 104).

Operation 504 includes, in response to receiving the asynchronous message, performing, by the host and before the expiration, a first input/output (I/O) operation on the second port associated with the second node using a failover path from the list of IP addresses. Performing the first I/O operation on the failover path enables the first I/O operation to be successfully completed. In some embodiments, the failover path includes a different IP address than the IP address associated with the failed path. In other embodiments, the failover path includes the same IP address as the IP address associated with the failed path, and the IP address is reconfigured from the failed path to the failover path prior to performing the first I/O operation on the failover path.

Operation 506 includes, in response to performing the first I/O operation on the second port, performing, by the host and after the expiration, a second I/O operation on the first port of the first node. As will be appreciated by one skilled in the art, the original failed path is likely restored after the expiration, thus, the host can successfully serve I/O operations to the original path (i.e., the failed path that is likely restored after the expiration). In embodiments where the failover path included a different IP address from the failed path, the second I/O operation is issued to the original IP address previously associated with the failed path. In embodiments where the IP address of the failed path is reconfigured to the failover path, that IP address is again reconfigured to the original path, and I/O operations are served to that IP address once it is reconfigured on the original path.

Although operations 504 and 506 are based on the expiration (e.g., before or after the expiration), alternative embodiments are contemplated whereby the asynchronous message contains no expiration, and the host instead receives a second asynchronous message when the original failed path is restored, thereby triggering operation 506 and implementation of failback operations.

Referring now to FIG. 6A, illustrated is a flowchart of an example method 600 for performing I/O operations on a failover path, in accordance with embodiments of the present disclosure. In some embodiments, the method 600 is a sub-method of operation 504 of FIG. 5. The method 600 can be performed by, for example, a failover manager (e.g., failover manager 800 of FIG. 8) or a different configuration of hardware and/or software.

Operation 602 includes logging out from a first Internet Protocol (IP) address associated with the first port on the first node in response to receiving the asynchronous message and before the expiration. In other words, operation 602 includes disconnecting from the failed path indicated in the asynchronous message. Operation 602 can prevent I/O operations from being served to the failed node.

Operation 604 includes logging into a second IP address from the list of IP addresses contained in the asynchronous message, where the second IP address can be associated with the second port on the second node. In some embodiments, operation 604 occurs in response to receiving the asynchronous message and before the expiration. In other words, operation 604 includes connecting to the failover path indicated in the asynchronous message. Operation 604 enables I/O operations originally scheduled to be implemented on the failed path to be successfully implemented on the failover path.

Referring now to FIG. 6B, illustrated is a flowchart of an example method 610 for performing I/O operations on a failback path, in accordance with embodiments of the present disclosure. In some embodiments, the method 610 is a sub-method of operation 506 of FIG. 5. The method 610 can be performed by, for example, a failover manager (e.g., failover manager 800 of FIG. 8) or a different configuration of hardware and/or software.

Operation 612 includes logging out of the second IP address on the second port of the second node after the expiration. In other words, after the expiration indicated in the asynchronous message, the failover path is disconnected.

Operation 614 includes logging into the first IP address on the first port of the first node after the expiration. In other words, after the expiration indicated in the asynchronous message, the failed path is restored because the failed node is likely functional after the expiration.

Referring now to FIG. 7A, illustrated is a flowchart of another example method 700 for performing I/O operations on a failover path, in accordance with embodiments of the present disclosure. In some embodiments, the method 700 is a sub-method of operation 504 of FIG. 5. The method 700 can be performed by, for example, a failover manager (e.g., failover manager 800 of FIG. 8) or a different configuration of hardware and/or software.

Operation 702 includes logging out from a first Internet Protocol (IP) address associated with the first port on the first node in response to receiving the asynchronous message and before the expiration. In other words, operation 702 can disconnect from the failed path indicated in the asynchronous message.

Operation 704 includes reconfiguring the first IP address to be associated with the second port on the second node. Operation 704 can migrate the first IP address from the failed path to the failover path so that I/O operations originally planned to be issued to the first IP address on the failed path can be issued to the first IP address on the failover path.

Operation 706 includes logging into the first IP address associated with the second port on the second node in response to receiving the asynchronous message and before the expiration. In other words, operation 706 can implement I/O operations on the failover path.

Referring now to FIG. 7B, illustrated is a flowchart of another example method 710 for performing I/O operations on a failback path, in accordance with embodiments of the present disclosure. In some embodiments, the method 710 is a sub-method of operation 506 of FIG. 5. The method 710 can be performed by, for example, a failover manager (e.g., failover manager 800 of FIG. 8) or a different configuration of hardware and/or software.

Operation 712 includes logging out of the first IP address on the second port of the second node after the expiration. Operation 714 includes reconfiguring the first IP address to be associated with the first port on the first node. Finally, operation 716 includes logging into the first IP address on the first port of the first node after the expiration. Operations 712-716 can disconnect from the failover path and reconnect to the failed path after the expiration indicated in the asynchronous message because, after the expiration, the failed path is likely restored and capable of serving I/O operations.

Figure 8:
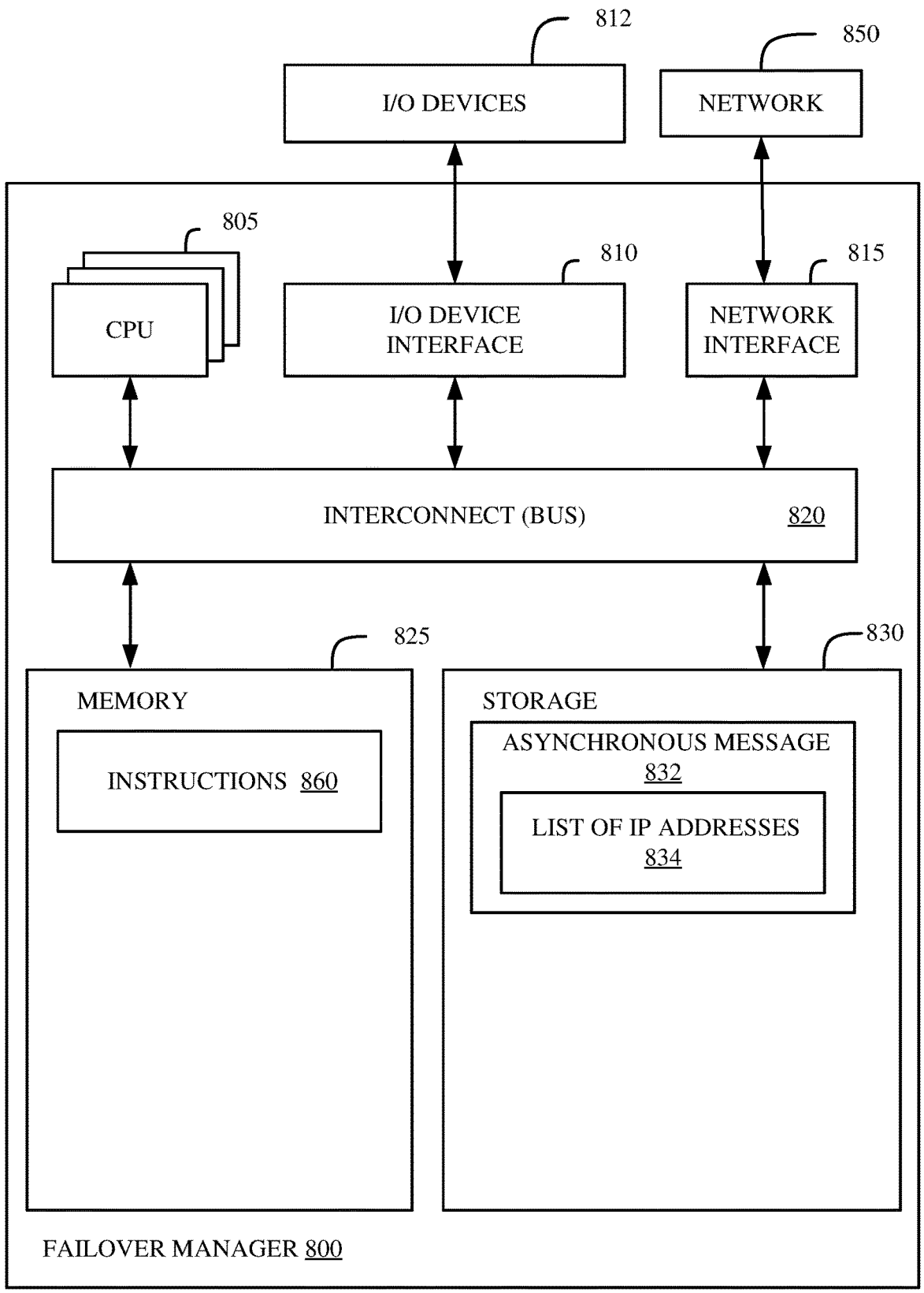
FIG. 8 illustrates a block diagram of an example failover manager, in accordance with embodiments of the present disclosure.

FIG. 8 illustrates a block diagram of an example failover manager 800 in accordance with some embodiments of the present disclosure. Failover manager 800 can be, for example, a storage controller, a SVC, a kernel driver (e.g., iSCSI kernel driver), a multipath driver, a user driver, a host (e.g., host 102), a node (e.g., node 1 112 or node 2 114), or other combinations of hardware and/or software (e.g., drivers, modules, components, etc.) configured to function in a computational environment.

In various embodiments, failover manager 800 can perform the methods described in FIGS. 5-7 and/or implement the functionality discussed in FIGS. 1-4. In some embodiments, failover manager 800 receives instructions related to aforementioned methods and functionalities by downloading processor-executable instructions from a remote data processing system via network 850. In other embodiments, failover manager 800 provides instructions for the aforementioned methods and/or functionalities to a client machine such that the client machine executes the method, or a portion of the method, based on the instructions provided by failover manager 800.

Failover manager 800 includes memory 825, storage 830, interconnect (e.g., BUS) 820, one or more CPUs 805 (also referred to as processors 805 herein), I/O device interface 810, I/O devices 812, and network interface 815.

Each CPU 805 retrieves and executes programming instructions stored in memory 825 or storage 830. Interconnect 820 is used to move data, such as programming instructions, between the CPUs 805, I/O device interface 810, storage 830, network interface 815, and memory 825. Interconnect 820 can be implemented using one or more busses. CPUs 805 can be a single CPU, multiple CPUs, or a single CPU having multiple processing cores in various embodiments. In some embodiments, CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random-access memory (e.g., static random-access memory (SRAM), dynamic random access memory (DRAM), or Flash). Storage 830 is generally included to be representative of a non-volatile memory, such as a hard disk drive, solid state device (SSD), removable memory cards, optical storage, or flash memory devices. In an alternative embodiment, storage 830 can be replaced by storage area-network (SAN) devices, the cloud, or other devices connected to failover manager 800 via I/O device interface 810 or network 850 via network interface 815.

In some embodiments, memory 825 stores instructions 860 and storage 830 stores asynchronous message 832. However, in various embodiments, instructions 860 and asynchronous message 832 are stored partially in memory 825 and partially in storage 830, or they are stored entirely in memory 825 or entirely in storage 830, or they are accessed over network 850 via network interface 815.

Instructions 860 can be processor-executable instructions for performing any portion of, or all of, any of the methods of FIGS. 5-7 and/or implementing any of the functionality discussed in FIGS. 1-4.

Asynchronous message 832 can be consistent with asynchronous message 138 of FIG. 1 and/or asynchronous message 400 of FIG. 4. Asynchronous message 832 can be generated by or received by failover manager 800. Asynchronous message 832 can contain a list of IP addresses 834 corresponding to a plurality of failover paths capable of serving I/O operations previously intended for a failed node.

In various embodiments, I/O devices 812 include an interface capable of presenting information and receiving input. For example, I/O devices 812 can present information to a user interacting with failover manager 800 and receive input from the user.

Failover manager 800 is connected to network 850 via network interface 815. Network 850 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
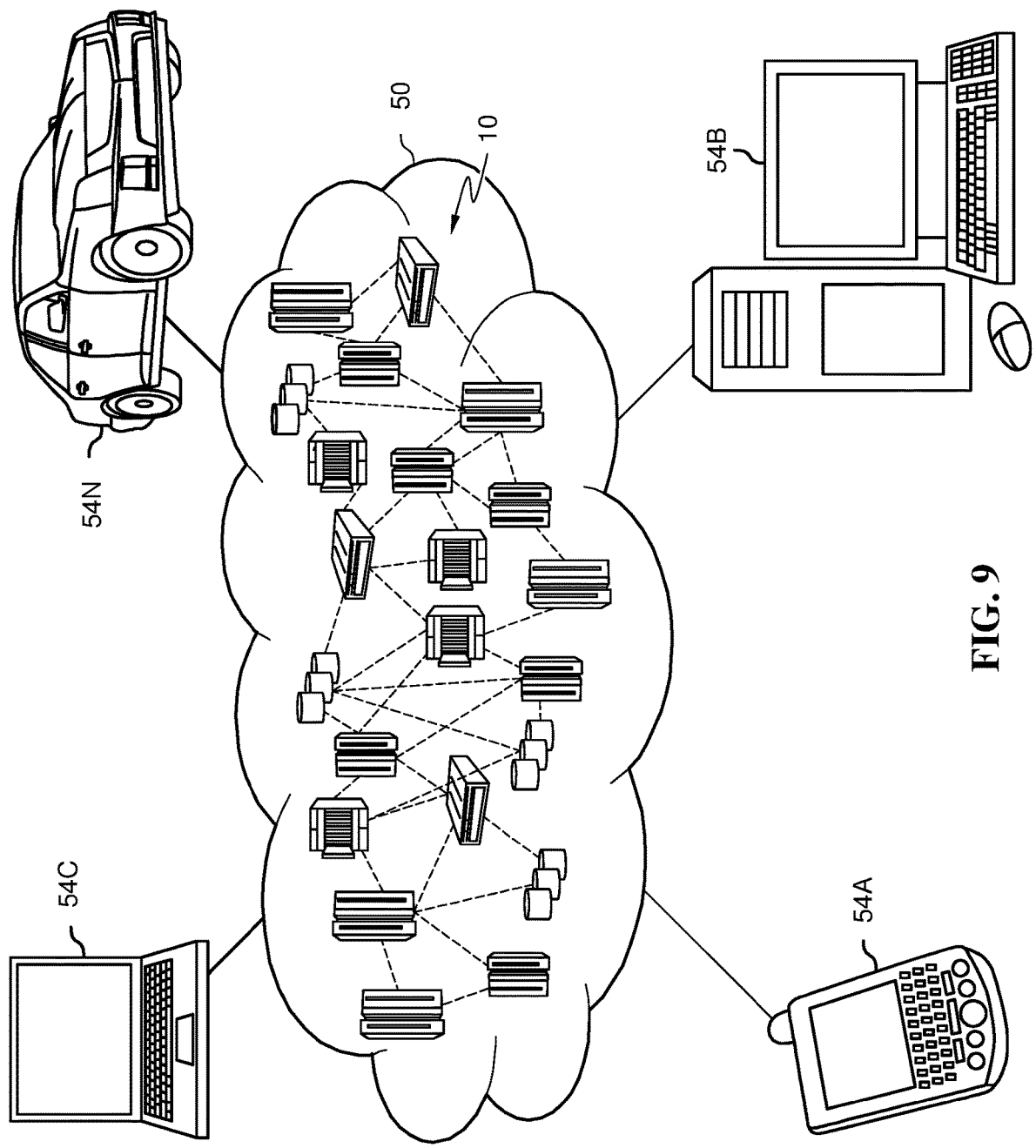
FIG. 9 depicts a cloud computing environment, according to some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
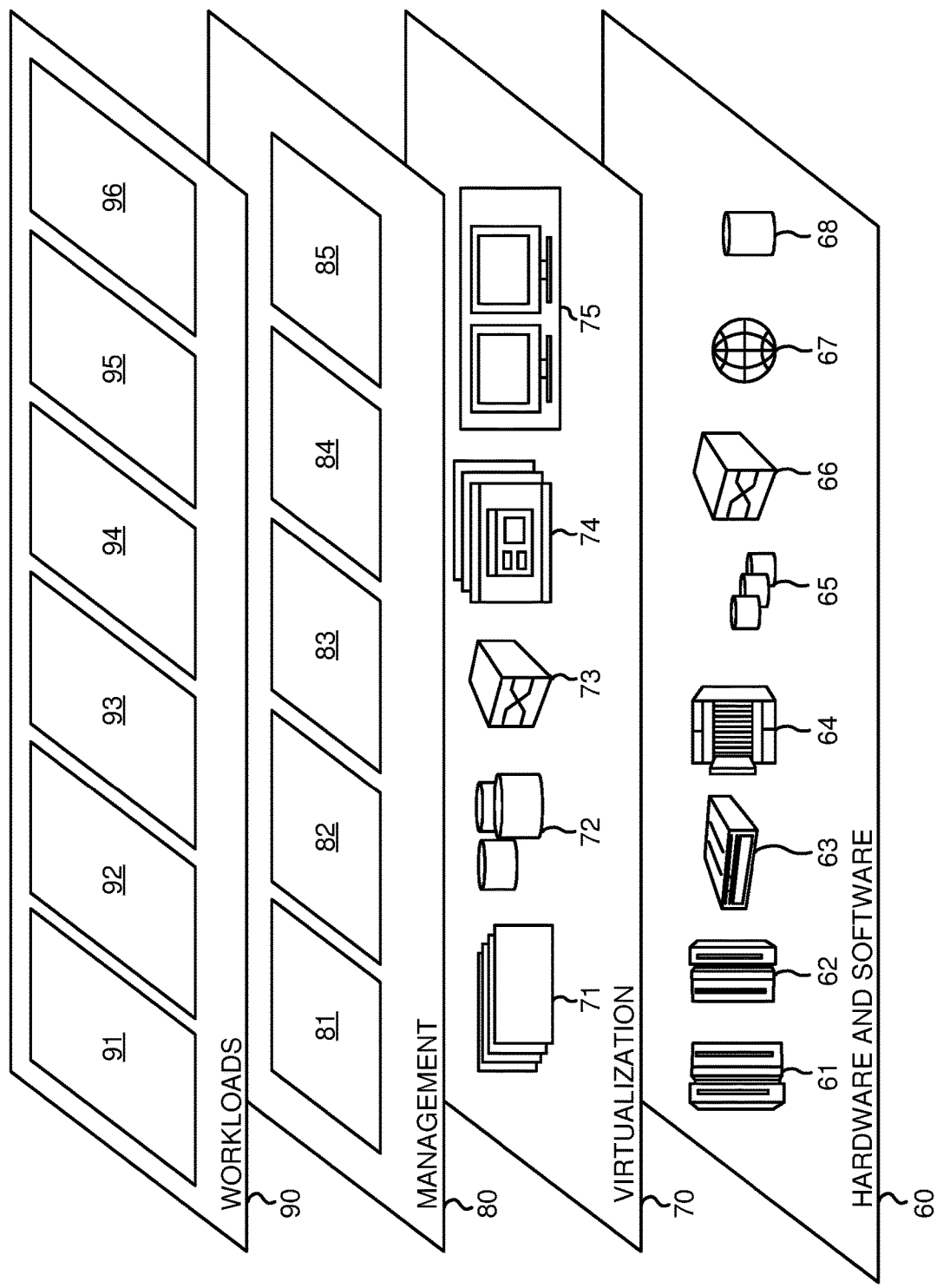
FIG. 10 depicts abstraction model layers, according to some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and failover management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any subset of the methods described with respect to FIGS. 5-7 and/or any of the functionality discussed in FIGS. 1-4) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for managing failover in a computational environment interconnected using an internet small computer systems interface (iSCSI) communication protocol, the method comprising:
   receiving, at a host and from a kernel driver, an asynchronous message comprising:
      an indication of a failed path associated with a first node having a first port;
      a list of internet protocol (IP) addresses associated with a plurality of failover paths, the plurality of failover paths including a first failover path associated with a second node having a second port; and
an expiration;
in response to receiving the asynchronous message, performing, by the host and before the expiration, a first input/output (I/O) operation on the second port associated with the second node using the first failover path from the list of IP addresses in the asynchronous message by:
logging out from a first IP address associated with the first port on the first node in response to receiving the asynchronous message and before the expiration;
reconfiguring the first IP address to be associated with the second port on the second node; and
logging into the first IP address associated with the second port on the second node in response to receiving the asynchronous message and before the expiration; and
in response to performing the first I/O operation on the second port, performing, by the host and after the expiration, a second I/O operation on the first port of the first node, wherein the failed path is restored after the expiration.

2. The method according to claim 1, wherein the asynchronous message indicates that the failed path includes the first node, the first port, and the first IP address, and wherein the asynchronous message indicates that the first failover path includes the second node, the second port, and the first IP address reconfigured on the second port of the second node.

3. The method according to claim 1, wherein performing the second I/O operation further comprises:
logging out of the first IP address on the second port of the second node after the expiration;
reconfiguring the first IP address to be associated with the first port on the first node; and
logging into the first IP address on the first port of the first node after the expiration.

4. The method according to claim 1, wherein the kernel driver is associated with an I/O group including both the first node and the second node.

5. The method according to claim 1, wherein the computational environment is managed using a Storage Area Network (SAN) volume controller (SVC).

6. The method according to claim 1, wherein the asynchronous message is received at the host in response to the kernel driver detecting the failed path.

7. The method according to claim 1, wherein the first failover path is based on the second node hosting a number of logins below a login threshold.

8. The method according to claim 1, wherein the first failover path is based on the second node having a resource utilization below a resource utilization threshold.

9. The method according to claim 1, wherein the asynchronous message is in protocol data unit (PDU) format and comprises an AsyncEvent value and an AsyncVcode value.

10. The method according to claim 9, wherein the AsyncEvent value is 255, and wherein the AsyncVcode value comprises a LOGOUT command and a RETRY command.

11. The method according to claim 1, wherein the host is configured to perform the computer-implemented method by executing program instructions downloaded from a remote data processing system.

12. A system for managing failover in a computational environment interconnected using an internet small computer systems interface (iSCSI) communication protocol, the system comprising:
a processor; and
a computer-readable storage medium communicatively coupled to the processor and storing program instructions which, when executed by the processor, are configured to cause the processor to perform a method comprising:
receiving, at a host and from a kernel driver, an asynchronous message comprising:
an indication of a failed path associated with a first node having a first port;
a list of internet protocol (IP) addresses associated with a plurality of failover paths, the plurality of failover paths including a first failover path associated with a second node having a second port; and
an expiration;
in response to receiving the asynchronous message, performing, by the host and before the expiration, a first input/output (I/O) operation on the second port associated with the second node using the first failover path from the list of IP addresses in the asynchronous message by:
logging out from a first IP address associated with the first port on the first node in response to receiving the asynchronous message and before the expiration;
reconfiguring the first IP address to be associated with the second port on the second node; and
logging into the first IP address associated with the second port on the second node in response to receiving the asynchronous message and before the expiration; and
in response to performing the first I/O operation on the second port, performing, by the host and after the expiration, a second I/O operation on the first port of the first node, wherein the failed path is restored after the expiration.

13. The system according to claim 12, wherein the asynchronous message is in protocol data unit (PDU) format and comprises an AsyncEvent value and an AsyncVcode value, wherein the AsyncEvent value is 255, and wherein the AsyncVcode value comprises a LOGOUT command and a RETRY command.

14. The system according to claim 12,
logging out of the first IP address on the second port of the second node after the expiration;
reconfiguring the first IP address to be associated with the first port on the first node; and
logging into the first IP address on the first port of the first node after the expiration.

15. A computer program product for managing failover in a computational environment interconnected using an internet small computer systems interface (iSCSI) communication protocol, the computer program product comprising a computer readable storage medium having program instructions embodied therewith, wherein the computer readable storage medium is not a transitory signal per se, the program instructions executable by a processor to cause the processor to perform a method comprising:
receiving, at a host and from a kernel driver, an asynchronous message comprising:
an indication of a failed path associated with a first node having a first port;
a list of internet protocol (IP) addresses associated with a plurality of failover paths, the plurality of failover paths including a first failover path associated with a second node having a second port; and
an expiration;

in response to receiving the asynchronous message, performing, by the host and before the expiration, a first input/output (I/O) operation on the second port associated with the second node using the first failover path from the list of IP addresses in the asynchronous message by:
- logging out from a first IP address associated with the first port on the first node in response to receiving the asynchronous message and before the expiration;
- reconfiguring the first IP address to be associated with the second port on the second node; and
- logging into the first IP address associated with the second port on the second node in response to receiving the asynchronous message and before the expiration; and in response to performing the first I/O operation on the second port, performing, by the host and after the expiration, a second I/O operation on the first port of the first node, wherein the failed path is restored after the expiration.

16. The computer program product according to claim 15, wherein the kernel driver is associated with an I/O group including both the first node and the second node.

17. The computer program product according to claim 15, wherein the computational environment is managed using a Storage Area Network (SAN) volume controller (SVC).

18. The computer program product according to claim 15, wherein the asynchronous message is received at the host in response to the kernel driver detecting the failed path.

19. The computer program product according to claim 15, wherein the first failover path is based on the second node hosting a number of logins below a login threshold.

20. The computer program product according to claim 15, wherein the first failover path is based on the second node having a resource utilization below a resource utilization threshold.

* * * * *